UNITED STATES PATENT OFFICE.

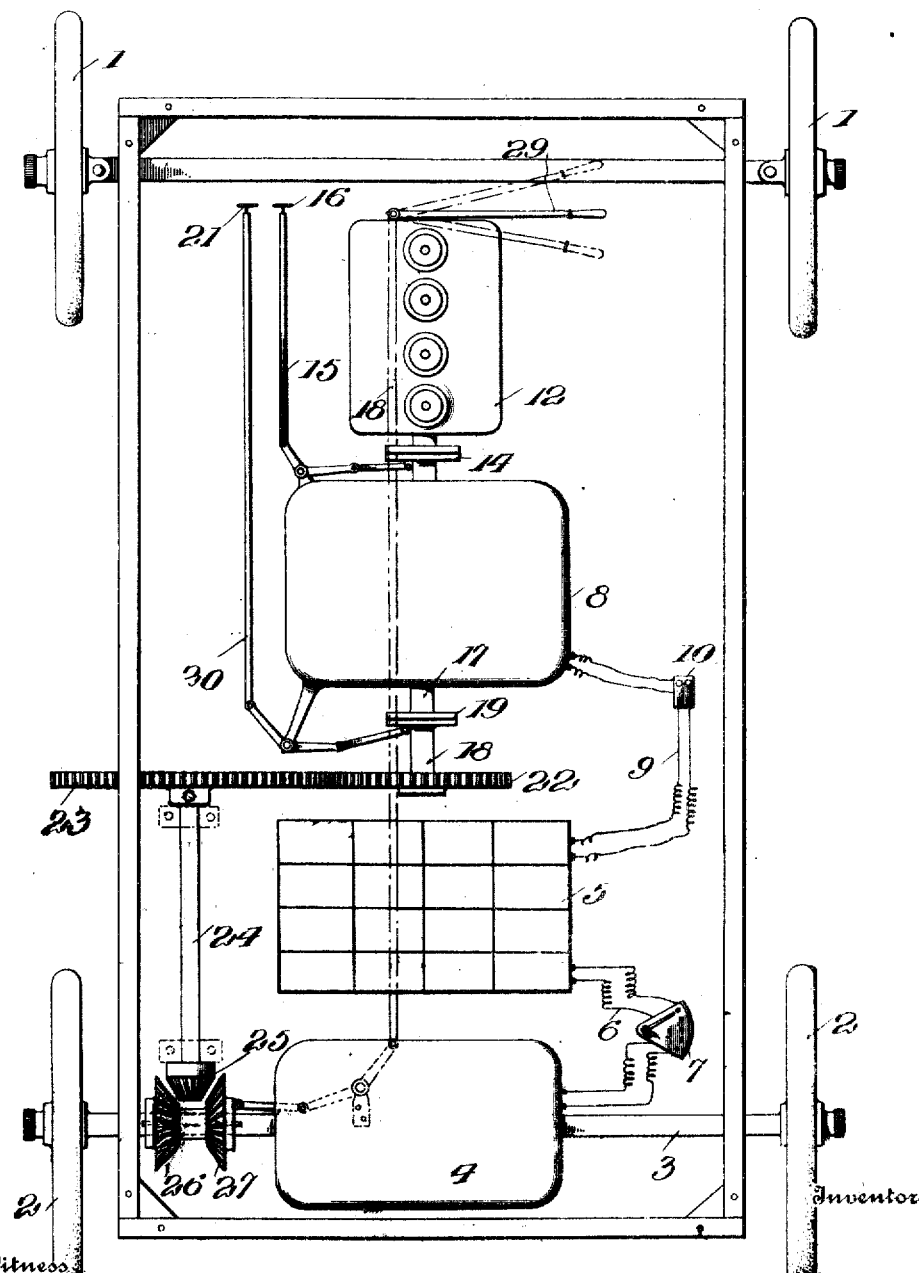

ALFRED NEWTON HAMRICK, OF SILT, COLORADO.

MOTOR-VEHICLE.

1,284,664.  Specification of Letters Patent.  Patented Nov. 12, 1918.

Application filed January 10, 1916. Serial No. 71,266.

*To all whom it may concern:*

Be it known that I, ALFRED NEWTON HAMRICK, of Silt, in the county of Garfield and State of Colorado, have invented certain new and useful Improvements in Motor-Vehicles; and I do hereby declare the following to be a full, clear, and exact description of the invention, such as will enable others skilled in the art to which it appertains to make and use the same.

My invention has reference to that class of motor vehicles employing a dynamo and means for operating the same, the dynamo being adapted to generate electric energy for use in a motor which is normally adapted to rotate the traction axle. In carrying forward this broad idea I employ improved means by which the vehicle when being propelled forward by its own momentum, as when coasting down a hill, may operate the dynamo to store up energy. I also provide means by which the element normally operating the dynamo, preferably a gas engine, may directly rotate the traction axle. I also provide means by which this engine may operate auxiliary to the motor and the two by independent connections rotate the traction axle.

In the accompanying drawing the figure is a plan view of a motor vehicle embodying my invention.

As illustrated, the running gear comprises forward wheels 1 and rear wheels 2, the latter connected by a traction axle 3 on which is fixed an electric motor 4, the axle 3 being movable with the armature of the motor. I have shown an accumulator 5 in the form of a series of storage batteries in electrical connection as at 6 with the motor 4, a rheostat 7 being located in the conductors. The storage batteries derive their electric energy from a dynamo 8 through conductors 9 in which is interposed a switch 10. The dynamo is preferably operated by means of a gas engine 12, the shafts intermediate the dynamo and the engine having a clutch 14 which may be operated by a bell crank lever 15 on which is a pedal 16 within ready reach of the operator of the car.

Also on the armature of the dynamo I have shown a shaft 17 in operative relation to a shaft 18, these stub shafts being connected by a clutch 19 operated by a bell crank lever 20 having a pedal 21.

The shaft 18 carries a gear 22 in mesh with a pinion 23 on a shaft 24, this shaft carrying at its free end a beveled gear 25 adapted to mesh with either one of a pair of gears 26, 27 keyed on the traction axle 3. These gears 26, 27 may be shifted so that one or the other of them will be in mesh with the gear 25 or into the neutral position by means of a rod 28 under the control of a lever 29 preferably arranged at the forward end of the car and within easy reach of the operator.

With the parts arranged as shown and described the engine 12 may constitute the means for working the dynamo 8 to create electric energy, the clutch 14 being closed. The electric energy created by the dynamo may be transmitted through conductors 9 and 6 to the storage batteries 5 and the motor 4. This may be termed the normal operating means. Assuming however that the vehicle is coasting and requires no traction power the rheostat 7 may be turned to cut out the motor 4 and the lever 29 shifted to bring one of the gears 26 or 27 into engagement with gear 25 and the pedal 16 may be operated to open the clutch 14 thus disconnecting the engine from the dynamo and the engine may be stopped. As a result the rotation of the traction axle 3 and the engagement of one of its gears with the shaft 24 will rotate the pinion 23 and gear 22, and clutch 19 being closed will result in operating the dynamo to store up energy in the batteries.

Again, with the motor 4 rendered ineffective the clutches 14 and 19 may remain closed and the engine 12 may be operated and its direct function will be to rotate the traction axle through the described train of gearing. In this position of parts switch 10 may be opened so that although the dynamo operates it will not be effective to store up energy. Or, manifestly, the motor 4 may be maintained effective to rotate the traction axle and in this position the function of the engine will be auxiliary to that of the motor.

I claim as my invention:

In a motor vehicle having a traction axle, a dynamo, means for operating said dynamo, a clutch controlling said operating means, a second clutch on the armature shaft of said dynamo, a second shaft in operative relation to said armature shaft and controlled by said second clutch, a gear wheel on said second shaft, gear wheels on said axle, a shaft having a gear adapted to engage said axle
5 gears, and a pinion on said latter shaft adapted to engage the gear on said second shaft.

In testimony whereof, I have signed this specification in the presence of two subscribing witnesses.

A. NEWTON HAMRICK.

Witnesses:
J. D. MILES,
MINNIE MILES.